April 12, 1966  M. WENZEL  3,246,155
ARRANGEMENT FOR MEASURING THE RADIO-ACTIVITY
OF THIN-LAYER-CHROMATOGRAMS
Filed Dec. 6, 1962
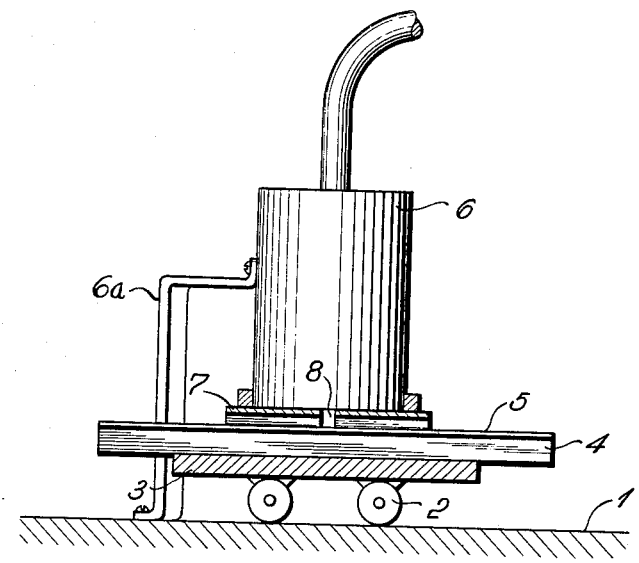
INVENTOR
MARTIN WENZEL
BY Erich M. H. Radol
AGENT

3,246,155
ARRANGEMENT FOR MEASURING THE RADIOACTIVITY OF THIN-LAYER-CHROMATOGRAMS
Martin Wenzel, Berlin-Dahlem, Germany, assignor to Laboratorium Prof. Dr. Berthold, Wildbad im Schwarzwald, Germany, a corporation of Germany
Filed Dec. 6, 1962, Ser. No. 242,753
Claims priority, application Germany, Dec. 7, 1961,
Reg. No. (utility model) 1,862,240
4 Claims. (Cl. 250—83.6)

In connection with analytic and preparation work, the method of thin-layer-chromatography has recently proved to be very useful. However, it was up to now not possible to determine the distribution of activity in thin-layer-chromatograms.

In connection with column-chromatographs of weak $\beta$-radiating substances, such as $H^3$, it has been attempted to realize activity measurements by means of scintillation admixtures, in liquid scintillation counters. This method, however, cannot be used in connection with thin-layer-chromatography.

It has also been proposed to scrape the thin-layer-chromatograms from its support strip by strip and to measure the individual fractions separately. This procedure is troublesome and entails considerable losses.

The main object of my invention resides in an arrangement which permits a continuous and automatic measurement of radio-activity in connection with thin-layer-chromatograms of weak $\beta$-radiating substances.

More in detail, my said invention consists in passing the carrier supporting the thin-layer-chromatogram beneath a flow counter which is preferably of very flat construction and is provided with a diaphragm or blende confronting the chromatogram passing beneath it on its said support. Thus in carrying the support across an opening of the diaphragm, it will be possible to check the thin layer in a continuous and differentiated manner regarding radio-activity.

The inventive idea may be reduced to practice in different ways. As far as possible, the surface of the thin layer support should be arranged very close to the underside of the diaphragm. The conveying means for the said support may be in the form of rails, small carriages, or the like.

A preferred embodiment of the invention is illustrated by way of a diagrammatic example in the drawings.

On a base 1 which for instance could consist of rails, there is arranged a carriage 3 provided with rollers 2 which may be moved along said rails by means of a clockwork drive mechanism, or the like. The carriage bears a support 4 of conventional design, such as a glass-plate which carries the thin-layer-chromatogram 5.

Above that, a counter 6, such as a methane flow counter-tube, is mounted; the underside thereof is covered by a diaphragm 7 provided with a slot 8 which is arranged crosswise to layer 5. The counter may be mounted in any conventional manner, as by a bracket 6a, attached to base 1.

It is important to use a rather thin diaphragm 7; a thickness of 0.2 mm. for instance has been shown to be useful. The width of slot 8 may be 1 mm., whereas its length could be something like 40 mm. The diaphragm should not have any protruding parts in order to avoid a greater separation from layer 5. This separation should be restricted to 1 to 2 mm. The whole arrangement could, for example be constructed in such a way that the distance between the surface of thin layer 5 and the inner edge of slot 8 is less than 4 mm.

Diaphragm 7 may be screwed to the counter-tube 6 or may be fastened by means of countersunk screws.

It is a surprising fact that the device as described above functions in a very satisfactory way even when measuring extremely weak $\beta$-radiating substances, such as $C^{14}$ or $H^3$ respectively, notwithstanding the fact that it does not provide an airtight seal and that the counting gas freely escapes through slot 8.

It is particularly advantageous to extend the diaphragm laterally beyond the counter-tube. This may be realized in such a way that the lateral edge of the said diaphragm extends beyond the slot by not less than 20 mm. If the carriage 2, 3 bearing support 4, is passed beneath slot 8, the control of radioactivity can be performed in a continuous, automatic and differentiated manner through the entire extent of the thin-layer-chromatogram 5.

The counter may be connected in the usual way to an amplifier and to a recording device.

What I claim is:

1. Apparatus for measuring the radioactivity of a thin-layer chromatogram, said apparatus comprising:
   a rigid, flat, horizontal structure adapted to support said chromatogram;
   means for displacing said structure along a predetermined path; and
   a gas flow counter tube containing counting gas positioned above the path, said tube having a diaphragm confronting said structure, said diaphragm having a narrow slot extending transversely to said path and permitting said counting gas to escape from the interior of said tube into the atmosphere, and said tube being spaced from said structure by a distance greater than the thickness of said chromatogram, and the interior surface of said diaphragm being spaced from the adjacent surface of said chromatogram by less than about 4 mm.

2. The apparatus of claim 1 further characterized in that said diaphragm extends beyond the edges of said slot by at least 1 cm. in every direction.

3. The apparatus of claim 2 further characterized in that said diaphragm has an average thickness of 0.2 mm.

4. The apparatus of claim 2 further characterized in that said slot has a width of approximately 1 mm. and a length of approximately 40 mm.

References Cited by the Examiner
UNITED STATES PATENTS

| | | | |
|---|---|---|---|
| 2,776,377 | 1/1957 | Anger | 250—71.5 |
| 2,978,602 | 4/1961 | Barnothy | 250—83.6 |
| 3,033,986 | 5/1962 | Fowler | 250—83.6 |

OTHER REFERENCES

Use of Beta-Ray Densitometry in Paper Chromatography, Analytical Chemistry, vol. 23, No. 1, January 1951, pages 207, 208.

RALPH G. NILSON, *Primary Examiner.*

JAMES W. LAWRENCE, *Examiner.*